United States Patent Office 3,790,534
Patented Feb. 5, 1974

3,790,534
INHIBITING PREVULCANIZATION OF
RUBBER FORMULATIONS
Marion J. Gattuso, Hoffman Estates, and Robert J. Arnold, Chicago, Ill., assignors to Universal Oil Products Company, Des Plaines, Ill.
No Drawing. Filed Mar. 16, 1972, Ser. No. 235,415
Int. Cl. C08c 11/54; C08d 9/00
U.S. Cl. 260—79.5 B                10 Claims

ABSTRACT OF THE DISCLOSURE

Inhibiting premature vulcanization of vulcanizable diene rubber formulations by incorporating therein a substituted-carbamyl disulfide.

BACKGROUND OF THE INVENTION

Various changes in the processing of rubber formulations have been adopted to facilitate the processing steps and to improve the properties of the rubber products. Some of these changes adversely affect the induction time or scorch delay period prior to vulcanization. One such change is the use of an antiozonant in the rubber formulation in order to impart protection to the rubber product against ozone cracking. The more popular antiozonants are of the phenylenediamine type and these antiozonants appear to promote scorching. Another change has been the use of high pH furnace black which appears to lack the inherent inhibiting effect of the acidic channel blacks. Still another change has been the use of higher processing temperatures.

DESCRIPTION OF THE INVENTION

It now has been found that premature vulcanization may be inhibited by incorporating a substituted-carbamyl disulfide in the rubber formulation.

In one embodiment, the present invention relates to the method of inhibiting premature vulcanization of a rubber formulation which comprises incorporating therein a substituted-carbamyl disulfide of the formula:

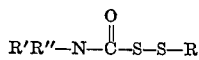

where R, R' and R" are independently selected from alkyl, cycloalkyl, aryl or heterocyclic. It is understood that the R groups also may contain substitutions thereon, which substitutions are nonreactive during the preparation of the substituted-carbamyl disulfide.

In another embodiment, the present invention relates to vulcanizable diene rubber formulation containing, as an inhibitor against premature vulcanziation, a substituted-carbamyl disulfide of the formula hereinbefore set forth.

Referring to the above formula where R, R' and/or R" are alkyl, the alkyl contains from 1 to 10 or more carbon atoms and preferably from 1 to 4 carbon atoms each. Illustrative examples of compounds in which all of the R groups are alkyl include methyl-N,N-dimethylcarbamyl disulfide,
ethyl-N,N-dimethylcarbamyl disulfide,
propyl-N,N-dimethylcarbamyl disulfide,
butyl-N,N-dimethylcarbamyl disulfide,
methyl-N,N-diethylcarbamyl disulfide,
ethyl-N,N-diethylcarbamyl disulfide,
propyl-N,N-diethylcarbamyl disulfide,
butyl-N,N-diethylcarbamyl disulfide,
methyl-N,N-dipropylcarbamyl disulfide,
ethyl-N,N-dipropylcarbamyl disulfide,
propyl-N,N-dipropylcarbamyl disulfide,
butyl-N,N-dipropylcarbamyl disulfide,
methyl-N,N-dibutylcarbamyl disulfide,
ethyl-N,N-dibutylcarbamyl disulfide,
propyl-N,N-dibutylcarbamyl disulfide,
butyl-N,N-dibutylcarbamyl disulfide,
ethyl-N-methyl-N-ethylcarbamyl disulfide,
ethyl-N-methyl-N-propylcarbamyl disulfide,
ethyl-N-methyl-N-butylcarbamyl disulfide,
ethyl-N-ethyl-N-propylcarbamyl disulfide,
ethyl-N-ethyl-N-butylcarbamyl disulfide,
ethyl-N-propyl-N-butylcarbamyl disulfide, as well as corresponding compounds in which one or more of the R groups contains from 5 to 10 or more carbon atoms each.

Referring to the above formula where at least one of the R groups is cycloalkyl, the cycloalkyl containss from 3 to 12 and preferably from 5 to 8 carbon atoms in the ring. Illustrative compounds in which the cycloalkyl group is cyclohexyl include cyclohexyl-N,N-dialkylcarbamyl disulfide, cyclohexyl-N,N-dicyclohexylcarbamyl disulfide, cyclohexyl-N-cyclohexyl-N-alkylcarbamyl disulfide, cyclohexyl-N,N - diphenylcarbamyl disulfide, cyclohexyl - N-cyclohexyl-N - phenylcarbamyl disulfide, cyclohexyl - N-alkyl-N-phenylcarbamyl disulfide, etc. In this embodiment, it is understood that the alkyl, when used, will contain from 1 to 10 or more and preferably from 1 to 4 carbon atoms. Also, in place of cyclohexyl other cycloalkyl containing 3 to 5 or 7 to 12 carbon atoms in the ring may be used. Furthermore, other aryl groups, including naphthyl, anthracyl, etc. may be substituted for the phenyl.

Where R in the above formula is aryl, it preferably is phenyl. Other aryl groups include naphthyl, anthracyl, etc. Illustrative compounds in which at least one of the R groups is phenyl include phenyl-N,N-dialkylcarbamyl disulfide,
phenyl-N,N-dicyclohexylcarbamyl disulfide,
phenyl-N-cyclohexyl-N-alkylcarbamyl disulfide,
phenyl-N,N-diphenylcarbamyl disulfide,
phenyl-N-cyclohexyl-N-phenylcarbamyl disulfide,
phenyl-N-alkyl-N-phenylcarbamyl disulfide, etc.

The alkyl and cycloalkyl groups correspond to those hereinbefore set forth and the phenyl group may be replaced by other aryl groups as also hereinbefore defined.

The alkyl, cycloalkyl and phenyl groups described above may contain substituents which are nonreactive under the conditions employed in the preparation of the final compound. The substitutions on the cyclic groups may comprise one or more, preferably one or two, alkyl of 1 to 10 and preferably from 1 to 4 carbon atoms each. Other nonactive substitutions may contain nitrogen and/or sulfur. Illustrative R groups containing nitrogen comprise, for example, dimethylaminomethyl, dimethylaminoethyl, dimethylaminopropyl, dimethylaminobutyl, diethylaminomethyl, diethylaminoethyl, diethylaminopropyl, diethylaminobutyl, dipropylaminomethyl, dipropylaminoethyl, dipropylaminopropyl, dipropylaminobutyl, dibutylaminomethyl, dibutylaminoethyl, dibutylaminopropyl, dibutylimino propyl dibutylaminobutyl, etc. Illustrative examples of R groups containing sulfur include, for example, methylthiomethyl, methylthioethyl, ethylthioethyl, ethylthiopropyl, propylthiopropyl, propylthiobutyl, butylthiobutyl, etc., derivatives of thioketones including, for example, thioacetone, thiomethylethyl ketone, thiodiethyl ketone, thioethylpropyl ketone, thiodipropyl ketone, thiopropylbutyl ketone, thiodibutyl ketone, etc., thioacetophenone, thiopropiophenone and other alkyl aryl thiophenones, thiobenzophenone and other diaryl thiophenones.

Illustrative R groups containing both nitrogen and sulfur include, for example, thiocarbamyl derivatives of the formula:

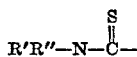

in which R′ and R″ are independently selected from alkyl of 1 to 10 carbon atoms, cycloalkyl and aryl. Here again, while the alkyl group may contain from 1 to 10 carbon atoms as hereinbefore set forth, the alkyl group preferably contains from 1 to 4 carbon atoms. Another illustrative R group containing nitrogen and sulfur is a thiazole, including particularly benzothiazole.

When one or more of the R, R′ and R″ is heterocyclic, the heterocyclic preferably contains nitrogen and/or sulfur in the ring. Illustrative examples in this embodiment are derived from pyrrole, pyridine, pyridazine, pyrimidine, pyrazine, acridine, imidazoline, etc. as illustrative of nitrogen containing heterocyclic groups; thiophene, benzothiophene, thianthrene, etc. as illustrative of sulfur containing groups; thiazole, dithiazole, thiadiazole, etc. as illustrative of heterocyclic groups containing both nitrogen and sulfur.

The R group is derived from a mercaptan derivative thereof, while the R′ and R″ groups come from the amine used as a reactant in preparing the final compound. Reference to the following discussion of the preparation of the final compound will elucidate this.

The substituted-carbamyl disulfides for use in the present invention are prepared in any suitable manner. These preparations are disclosed in the prior art and need not be described in detail herein. A preferred preparation is in accordance with the following series of equations.

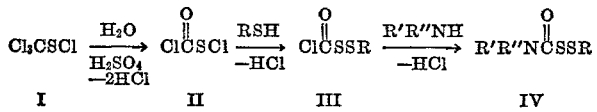

Referring to the above reactions, readily available perchloromethyl mercaptan (I) is hydrolyzed to the chlorocarbonylsulfenyl chloride (II), which is reacted with a mercaptan in which R is defined as hereinbefore set forth to form the substituted-chlorocarbonyl disulfide (III), which then is reacted with a di-substituted-amine to form the substituted-carbamyl disulfide. Typical reactions are described in more detail in the examples forming part of the present specifications.

From the above description, it will be seen that a number of different substituted-carbamyl disulfides may be used in accordance with the present invention. It is understood that these different compounds are not necessarily equivalent in the same rubber formulation.

The substituted-carbamyl disulfide is used as an inhibitor in any suitable concentration, which may vary with the particular rubber formulation. The concentration may be within the range of from about 0.1 to about 5 and more specifically in the range of from about 0.1 to about 2 p.h.r. (parts per hundred parts by weight of rubber hydrocarbon).

The substituted-carbamyl disulfide is used in any vulcanizable diene rubber formulation in order to inhibit premature vulcanization. The rubber formulation may be of synthetic or natural origin. Illustrative but not limiting rubber formulations include SBR (styrene-butadiene), polymers of butadiene or copolymers thereof with other monomers as, for example, acrylonitrile, isobutylene, methyl-methacrylate, cis-4-polybutadiene, butyl rubber, ethylene propylene terpolymers, etc.

In order to protect the rubber product against cracking due to ozone, an antiozonant generally is incorporated in the rubber formulation. Any suitable anti-ozonant is used and, in one embodiment, is of the phenylenediamine type and includes, for example, N,N′-di-sec-alkyl-p-phenylenediamine in which each alkyl contains from 3 to 12 carbon atoms, N-phenyl-N′-sec-alkyl-p-phenyl- enediamine in which the alkyl contains from 3 to 12 carbon atoms, N,N′-dicyclohexyl-p-phenylenediamine, N-phenyl-N′-cyclohexyl-p-phenylenediamine, etc. In another embodiment the antiozonant is of the aminophenol type and includes N-$C_3$ to $C_{20}$-alkyl-p-aminophenol, N-cycloalkyl-p-aminophenol in which the cycloalkyl ring contains from 3 to 12 carbon atoms, etc. The antiozonant may be used in a concentration of from 1 to about 5 parts by weight per 100 parts of rubber hydrocarbon in the formulation.

The rubber formulation generally includes a vulcanization accelerator. Any suitable vulcanizing accelerator may be used and conveniently comprises a conventional accelerator. Illustrative aromatic thiazole accelerators include 2-mercaptobenzothiazole,
N-cyclohexyl-2-benzothiazole sulfenamide,
N-tert-butyl-2-benzothiazole sulfenamide,
2-(morpholinothio)-benzothiazole,
N-phenyl-2-benzothiazole sulfenamide,
2-benzothiazolyl diethyldithiocarbamate, amine salts of mercaptobenzothiazole accelerators, etc. Other accelerators include tetramethylthiuram disulfide, thiocarbamyl sulfenamides, thioureas, xanthates, guanidine derivatives, etc. The vulcanizing accelerator will be used in conventional concentrations in the rubber formulation and may be within the range of from about 0.4 to about 3.0 parts by weight per 100 parts of rubber hydrocarbon in the formulation. It is understood that smaller or larger concentrations may be used when desired.

In addition, the rubber formulation generally will include carbon, zinc oxide, sulfur, stearic acid, antioxidant, etc., as well as oil extender when desired, all of these being used in conventional concentrations. The vulcanization is effected in conventional manner.

The following examples are introduced to illustrate further the novelty and utility of the present invention but not with the intention of unduly limiting the same.

EXAMPLE I

Referring to the series of equations hereinbefore set forth, chlorocarbonylsulfenyl chloride (II) was prepared as follows.

A mixture of 211 ml. of concentrated sulfuric acid, 18 g. (1.0 mole) of water and 186 g. (1.0 mole) of perchloromethyl mercaptan was heated to 45–50° C. and stirred for three hours. At the end of this time the evolution of hydrogen chloride had ceased and the mixture had returned to room temperature. The resulting two layers were separated and the light layer distilled to give 80.5 g. (61.7%) of the chloride, B.P. 90–95° C./760 torr.

Ethylchlorocarbonyl disulfide (III) was prepared by adding dropwise with stirring and cooling (10–20° C.) 25 g. (0.4 mole) of ethyl mercaptan to 52.4 g. (0.4 mole) of chlorocarbonylsulfenyl chloride (II). The resulting yellow oil was stirred for an additional 30 min. and then distilled to yield 56.9 g. (90.8%) of the disulfide, B.P. 64° C./11 torr.

Ethyl-N,N-diisopropylcarbamyl disulfide was prepared by adding dropwise 15.7 g. (0.1 mole) of ethylchlorocarbonyl disulfide (III) to 20.2 g. (0.2 mole) of diisopropylamine in about 300 ml. of benzene. After an additional 30 min. of stirring the mixture was washed with water to remove amine hydrochloride, dried over $MgSO_4$ and the solvent removed to give an amber oil which on distillation afforded 18.1 g. (86.7%) of the disulfide, B.P. 88° C./0.1 torr. The material crystallized after standing several days and purification by sublimation gave white crystals, M.P. 41–42.5° C. Elemental analyses showed 48.79% carbon, 8.54% hydrogen and 28.9% sulfur, which correspond to the calculated values of 45.89% carbon, 9.15% hydrogen and 30.63% sulfur.

EXAMPLE II

Ethyl-N,N-dicyclohexylcarbamyl disulfide was prepared in a similar manner as described above except that dicyclohexylamine was utilized as a reactant instead of diisopropylamine. Elemental analyses of the ethyl-N,N-dicyclohexylcarbamyl disulfide showed 59.09% carbon, 9.32% hydrogen and 21.3% sulfur, which correspond to the calculated values of 59.75% carbon, 9.03% hydrogen and 21.27% sulfur.

EXAMPLE III

Cyclohexyl-N,N-dicyclohexylcarbamyl disulfide was prepared in a similar manner as described above except that cyclohexyl mercaptan and dicyclohexylamine were used as reactants. The cyclohexyl-N,N-dicyclohexylcarbamyl disulfide had a melting point of 80–82° C. Elemental analyses showed 64.85% carbon, 9.35% hydrogen and 17.2% sulfur, which correspond to the calculated values of 64.17% carbon, 9.35% hydrogen and 18.03% sulfur.

EXAMPLE IV

The substituted-carbamyl disulfides prepared in the above manner were evaluated as prevulcanization inhibitors in a rubber formulation of the following recipe:

TABLE I

| Ingredient: | Parts by weight |
| --- | --- |
| SBR 1502 | 100.00 |
| Furnace black | 40.00 |
| Oil extender | 10.00 |
| Zinc oxide | 3.00 |
| Stearic acid | 2.00 |
| Sulfur | 2.00 |
| Antiozonant [1] | 2.00 |
| TBBS [2] | 1.25 |
| Substituted-carbamyl disulfide | 0.50 |

[1] N,N'-di-2-octyl-p-phenylenediamine.
[2] N-tert-butyl-benzothiazole-2-sulfenamide.

The ingredients were incorporated by conventional milling procedures and the formulations were cured for 40 minutes at 140° C.

The scorch properties were determined with a large rotor Mooney viscometer at 250° F. (ASTM D-1077-55T). The values represent the number of minutes for a rubber containing a curing agent to increase in viscosity by 5 and then by 20 points. This method simulates conditions encountered during milling and subsequent vucanization. A long scorch time indicates a high resistance to scorching.

The results of these evaluations are reported in the following table, along with a control run (Run No. 1) made without the use of the scorch inhibitor. The scorch inhibitors used in runs 2, 3 and 4 are ethyl-N,N-diisopropylcarbamyl disulfide, prepared as described in Example I; ethyl-N,N-dicyclohexylcarbamyl disulfide, prepared as described in Example II and cyclohexyl-N,N-dicyclohexylcarbamyl disulfide, prepared as described in Example III, respectively.

TABLE II

| Run number | Scorch inhibitor | Mooney scorch 5 pt. | Mooney scorch 20 pt. | Percent increase in 5 pt. rise as compared to blank |
| --- | --- | --- | --- | --- |
| 1 | None | 22.9 | 25.4 | |
| 2 | Example I | 28.1 | 30.6 | 23.7 |
| 3 | Example II | 34.1 | 36.3 | 48.9 |
| 4 | Example III | 29.9 | 35.2 | 30.6 |

From the data in the above table, it will be noted that the substituted-carbamyl disulfides inhibited prevulcanization of the rubber formulation. In this particular rubber formulation, the ethyl-N,N-dicyclohexylcarbamyl disulfide (Run No. 3) was the most effective. However, the particular substituted-carbamyl disulfide will be selected with regard to the particular processing method employed at a given manufacturing plant in order to provide the time desired to safely handle the rubber formulation prior to curing.

EXAMPLE V

The substituted-carbamyl disulfide of this example is 2-benzothiazolyl-N,N-diphenylcarbamyl disulfide and is prepared by the reaction of chlorocarbonylsulfenyl chloride with 2-mercaptobenzothiazole and the resultant benzothiazolyl chlorocarbonyl disulfide is further reacted with diphenylamine. This compound is utilized in a natural rubber formulation containing 3 p.h.r. (parts per hundred of rubber hydrocarbon) of N-phenyl-N'-(1,3-dimethylbutyl)-p-phenylenediamine antiozonant and 0.75 p.h.r. of N-cyclohexyl-2-benzothiazole sulfenamide accelerator. The substituted-carbamyl disulfide is utilized in a concentration of 0.75 p.h.r. and the rubber recipe is processed in conventional manner. Because the scorch inhibitor contains a benzothiazole configuration, the other accelerator is utilized in a lower concentration than normally. The rubber formulation containing 3 p.h.r. (part per hundred value and the rubber product is protected against ozone cracking.

EXAMPLE VI

A cis-4-polybutadiene formulation is prepared to contain 3 p.h.r. of N,N'-di-(1,3 - dimethylbutyl)-p-phenylenediamine antiozonant, 1.25 p.h.r. of N-tert-butylbenzothiazole - 2 - sulfenamide accelerator and 0.6 p.h.r. of phenyl-N,N-dibutylcarbamyl disulfide.

EXAMPLE VII

In this example, 1.0 p.h.r. of hexyl-N,N-dimethylcarbamyl disulfide is incorporated in an ethylene propylene terpolymer formulation to inhibit scorching.

We claim as our invention:

1. Vulcanizable diene rubber formulation containing sulfur, a vulcanization accelerator and, as an inhibitor against premature vulcanization, a carbamyl disulfide of the formula:

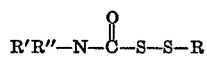

where R, R' and R'' are independently selected from alkyl, cycloalkyl, aryl or heterocyclic containing nitrogen, sulfur or both nitrogen and sulfur in the ring.

2. The formulation of claim 1 in which R, R' and R'' are the same or different alkyl groups containing from 1 to 10 carbon atoms each.

3. The formulation of claim 2 in which said alkyls contain from 1 to 4 carbon atoms each.

4. The formulation of claim 1 in which R is alkyl of 1 to 10 carbon atoms and R' and R'' are cycloalkyl containing from 3 to 12 carbon atoms in the ring.

5. The formulation of claim 4 in which said cycloalkyls are cyclohexyl.

6. The formulation of claim 1 in which R, R' and R'' are cyclohexyl.

7. The formulation of claim 1 in which R' and R'' are phenyl.

8. The formulation of claim 1 in which R is phenyl.

9. The formulation of claim 1 in which R is heterocyclic containing sulfur.

10. The formulation of claim 9 in which R is benzothiazolyl.

References Cited

Svetlik, J. F., et al., Indust. and Eng. Chem., 47, pp. 352–356 (2–55).

JOSEPH L. SCHOFER, Primary Examiner
C. A. HENDERSON, Jr., Assistant Examiner

U.S. Cl. X.R.
260—780, 787, 793